Jan. 9, 1940.   R. HIGGINS   2,186,486

CAPACITANCE POTENTIAL DEVICE

Filed July 8, 1939

INVENTOR
BY Ralph Higgins
Alpheus J. Crane
ATTORNEY

Patented Jan. 9, 1940

2,186,486

UNITED STATES PATENT OFFICE 2,186,486

CAPACITANCE POTENTIAL DEVICE

Ralph Higgins, Akron, Ohio, assignor to The Ohio Brass Company, Mansfield, Ohio, a corporation of New Jersey Application July 8, 1939, Serial No. 283,414

7 Claims. (Cl. 172—238)

This invention relates to a capacitance potential device for diverting energy from high potential transmission lines of the type in which a transformer is connected to the line by condensers in series with the transformer.

The invention is in the nature of an improvement on the transformer network shown in my prior Patent No. 1,950,676, dated March 13, 1934, assigned to The Ohio Brass Company, of Mansfield, Ohio.

One object of the invention is to provide an improved circuit connection for damping out oscillations that might otherwise under some circumstances result from disturbances on the transmission line.

Another object of the invention is to provide a transformer network in which numerous adjustable taps on the transformer secondary are not required.

A further object of the invention is to provide a transformer network for a capacitance coupling in which all of the adjustments may be mounted in a case which can be stationed at a distance from the step down transformer.

A further object of the invention is to provide a step down transformer network for capacitance couplings which shall be of improved construction and operation.

Other objects and advantages will appear from the following description.

The invention is exemplified by the combination and arrangement of parts and apparatus shown in the accompanying drawing and described in the following specification, and it is more particularly pointed out in the appended claims.

Figure 1:
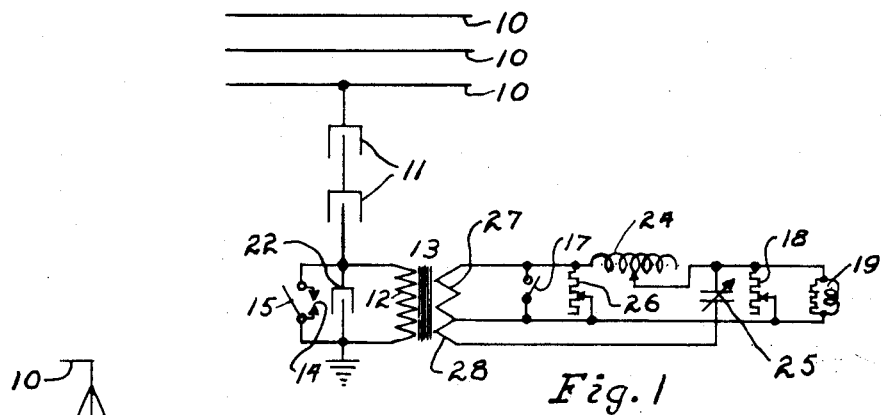
Fig. 1 is a simplified diagram illustrating one embodiment of the present invention.
Figure 3:
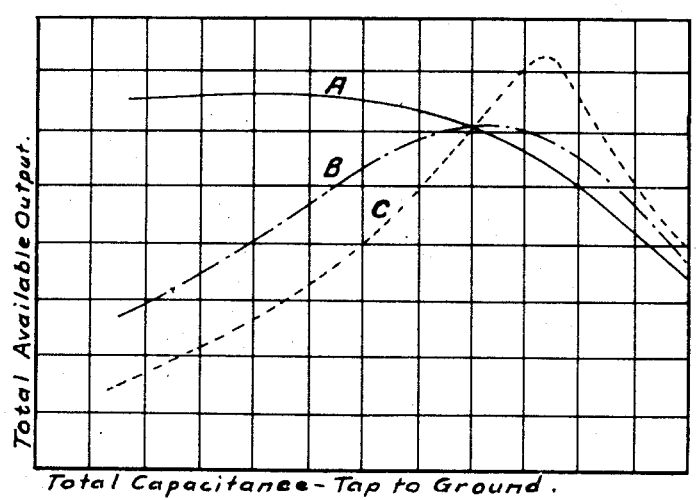
Fig. 3 is a graph by means of which one aspect of the performance of the present invention may be compared with that of prior devices.

In the embodiment of the invention shown in Fig. 1, the general arrangement is similar to that shown in Fig. 3 of my prior patent referred to above, and in this figure the numerals 10 designate the conductors of a three-phase transmission line to which the capacitors 11 connect the primary 12 of a transformer 13. One terminal of the primary is grounded and a capacitor 22 is connected in parallel with the primary winding. A protective gap 14 and a grounding switch 15 are also connected in parallel with the primary winding. The secondary winding of the transformer 13 has a portion 27 of its turns connected to a burden 19, which may be a metering device, a relay, synchronizing mechanism or other electrical apparatus supplied with energy through the capacitance coupling. A switch 17 is provided for short-circuiting the secondary winding 27 and an adjustable induction 24 is connected in one side of the line in series with the burden 19. Adjustable non-inductive resistance shunts 18 and 26 are connected in parallel with the burden 19 and the windings 27, respectively. The parts thus far described are similar to the corresponding parts of the circuit shown in Fig. 3 of my prior patent mentioned above and have been given reference numbers corresponding to the numbers of the corresponding parts in said figure.

In the present invention, however, the condenser 25 instead of being connected directly across the line in parallel with the burden 19, has one terminal connected to the line between the reactor 24 and the burden 19, and has the other terminal connected to extension turns 28 of the secondary winding of the transformer 13 so that the windings 28 are in series with the condenser 25. This has been found to result in two distinct advantages over the arrangement shown in my prior patent. One is that the new arrangement helps to damp out more effectively oscillations which occur from disturbances on the line, which is particularly desirable in connection with relay operation where a star-delta connection is used for the relays on a three-phase system. In the arrangement shown in Fig. 3 of the prior patent, the condenser 25 is in parallel with the inductance of the burden 19, and although the resistance 18, in connection with the resistance of the burden tends to damp out oscillations, it has been found that in some installations this damping effect is not sufficient especially when the burden has a large inductive component. In the present arrangement, however, since the capacitor 25 is not connected directly in parallel with the burden inductance, but in series with the winding 28, it is seen that any oscillatory circuit that may be set up in series with this capacitance, will also be in series with the transformer winding; and thereby can be made non-oscillatory or dead beat by means of a resistor paralleling any portion of the winding. This arrangement has been found to be very effective in damping out oscillations which otherwise might interfere with the correct operation of the relays, particularly of the high speed type.

A second advantage of the new arrangement is that it produces approximately maximum output for a wide variation of the capacitance in parallel with the primary of the transformer. Usually, a fixed capacitor 22 is connected in parallel with the primary of the transformer, but this does not constitute the entire capacitance in this part of the circuit. The capacitance of the cable connections and of the housing and other apparatus which may vary for different installations changes the effective capacitance in parallel with the transformer primary. In prior installations, this variation in capacitance has greatly affected the output of the coupler, and in order to compensate for this variation, it has been necessary to provide a plurality of taps on the secondary of the transformer, as illustrated by the adjustable connection in the diagram shown in my prior patent.

In Fig. 3 of the drawing, the curve A shows a total available output for various amounts of capacitance between the tap on the condenser stack and ground. It will be seen from this curve that there is a wide range of capacitance through which approximately maximum output is available. The curve B shows the relation of the same factors shown in Fig. 3 of my prior patent. Curve C shows the relation of the same factors on other forms of network most commonly used and which are not provided with the adjusting resistances 18 and 26 of the prior patent and which depend upon accurate tuning of the series reactor and adjustable capacitances, one in parallel with the burden and the other in parallel with transformer winding. Since the peak of curve C is quite sharp, it shows that this circuit is highly resonant, while curve A with a flat top indicates a circuit which is typically non-oscillatory. These curves, of course, apply to the various networks for a single connection to the secondary winding of the transformer. In the devices corresponding to curves B and C, whenever the capacitance between the tap on the condenser stack and ground vary, it is necessary to adjust the tap on the secondary of the transformer to compensate for the variation in output resulting from the change in capacitance. With the present invention, however, as shown in curve A, such adjustments of the secondary winding are not required because of the wide permissible variation of capacitance without material change in the network output.

Figure 2:
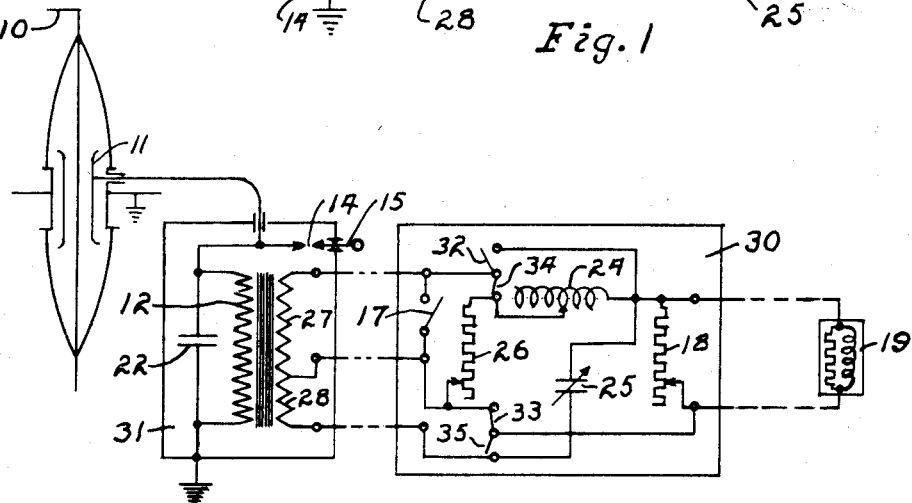
Fig. 2 is a somewhat more elaborate diagram showing the invention as applied to a capacitance coupling connected with a bushing insulator.

Because it is possible to dispense with the taps on the secondary of the transformer, the adjustable elements for controlling the phase angle and voltage may be mounted in a cabinet separate from the transformer housing, since it is only necessary to connect this cabinet to the transformer housing by three leads, as shown in Fig. 2 of the drawing. There is a great advantage in this connection because the cabinet containing the adjusting network may be placed at any convenient position at a distance from the transformer housing, as in a station close to the burden, while at the same time it is desirable to have the transformer housing close to the capacitance coupling to eliminate danger of inaccuracies resulting from a long connection between the capacitance coupling and the transformer housing. This characteristic will be understood more thoroughly from the discussion in my prior Patent No. 1,937,148, November 28, 1933, which describes a construction in which the capacitors are mounted directly on the housing for the step down transformer.

In the construction shown in Fig. 2 of the drawing, the network is the same as that shown in Fig. 1, but the adjusting mechanism is illustrated as mounted in a cabinet 30 separate from the transformer housing which is illustrated at 31. Switches or link connections 32, 33, 34 and 35 are interposed in the circuit so that by shifting these the connection resulting may be that of either Fig. 1, 2 or 3 of my prior patent. These various arrangements have certain advantages for certain purposes, as explained more fully in the prior patent. When the switches are in full line position, as shown in Fig. 2 of the drawing, the connection is the same as Fig. 1 of the present application. This circuit is applicable principally where a burden voltage of 66.5 is desired substantially in 0° phase angle relation with the H. T. line-to-neutral voltage as on star to delta three-phase relay systems. On such applications it is most essential to avoid or dampen out all transients in the relay voltages occurring on certain line to ground faults. By closing switch 35 and opening switch 33, the connection may be changed to that of Fig. 3 of the prior patent. This circuit can be used effectively on applications requiring 115 volt single phase output, also at 0° phase angle relation, for some metering, synchronizing and voltage indication work. On such applications it is not so important to suppress all transient oscillations, hence, the adjusting condenser 25 may be used directly in parallel with the burden. This feature enables one to obtain the increased voltage output with less complication in the network, as the full secondary windings 27 and 28 may be used for the burden taps. Best results are obtained with this scheme when the winding 27 is approximately ⅔ of the total secondary winding.

With switches or link connections 32 and 33 closed and 34 and 35 opened, the connection shown in Fig. 2 of the prior patent can be obtained. This scheme has its principal application when a 115 volt output is desired at any phase angle relation from 60° to 120° leading, such as when synchronizing between this capacitance potential device and some other similar potential device or standard potential transformer on another phase of the H. T. system. Usually the adjusting capacitance 25 is reduced to zero and so not used when using this connection scheme. Another use of this connection of the adjusting network is on residual ground relay application where two or more capacitance tap bushings or capacitors of a polyphase system are connected to one transformer as described in Patent No. 1,967,652, July 24, 1934. Here advantage is taken of the wide range of phase angle adjustment in order to bring the output voltage from the potential device more nearly in phase with "fault" current for a more speedy and positive relay operation.

Also, with switches or link connections 32 and 33 closed and 34 and 35 opened, and with the capacitance of 25 and the inductance 24 reduced to zero, it is a duplicate of Fig. 1 of the prior patent. This connection is convenient for applications where no definite phase angle relation is required of the output voltage as on some voltage relays and indication meters. Thus, the network scheme as shown in Fig. 2 may be made to meet practically all applications required of this device.

I claim:

1. The combination with an alternating voltage source of a transformer having its primary winding capacitatively connected with said source, a burden connected with the secondary of said transformer, and means for influencing the phase angle of the voltage impressed on said burden relative to the voltage of said source, said means comprising supplemental winding turns on said transformer and a capacitor connected in series circuit relation with said turns.

2. In combination an alternating voltage source, a capacitor, a transformer having its primary winding connected with said source by said capacitor, a secondary circuit including a useful burden connected with the secondary of said transformer, and means for controlling the magnitude and phase angle relation of the voltage impressed on said burden, said means comprising supplemental turns on said transformer, and a capacitor in series relation with said supplemental turns and forming a circuit with said turns in shunt relation with said burden.

3. The combination with an alternating voltage source of a transformer, a capacitor connecting the primary of said transformer with said source, a secondary circuit including a useful burden connected with a secondary of said transformer, and means for influencing the magnitude and phase angle relation of the voltage impressed on said burden, said means comprising a circuit in shunt relation with said burden and including supplemental secondary turns on said transformer and a capacitor in series relation with said supplemental turns.

4. In combination with a high voltage alternating current transmission line, a capacitor connected with said line, a transformer having its primary winding connected between said capacitor and ground, a secondary circuit connected with some of the turns of the secondary winding of said transformer, a useful burden connected in said secondary circuit, an inductance in series with said burden, and a supplemental circuit comprising additional turns of said secondary winding in series with said first mentioned turns, said supplemental circuit including also a capacitor in series with said supplemental turns, said supplemental circuit being connected to said secondary circuit between said burden and said inductance.

5. In combination a source of alternating voltage, a capacitor connected to said source, a transformer having its primary winding connected between said capacitor and ground, additional capacitance in shunt with said primary winding, a secondary circuit including a useful burden connected to a portion of the secondary winding of said transformer, and means for increasing the high available output range of said secondary circuit for various values of said additional capacitance, said means comprising supplemental secondary windings on said transformer and an adjustable capacitance connected in series relation with each other and in shunt relation with said burden.

6. In combination a source of alternating voltage, a capacitor connected with said source, a transformer having its secondary winding connected between said capacitor and ground, additional capacitance in shunt with said primary winding, a secondary circuit connected with a portion of the secondary turns of said transformer and comprising a useful burden, an inductance in series with said burden, a resistance in shunt with said burden, a resistance in shunt with said secondary turns, and a supplemental circuit comprising a capacitor in series with additional turns of said secondary winding, said supplemental circuit being connected to said secondary circuit at a point between said inductance and said burden.

7. In combination a source of alternating voltage, a capacitor connected with said source, a transformer having its primary winding connected between said capacitor and ground, additional capacitance in shunt with said primary winding, a secondary circuit connected with some of the turns of the secondary windings of said transformer, said secondary circuit including a useful burden, and means for adjusting the magnitude and phase angle relation of the voltage impressed on said burden, said adjusting means comprising a capacitor and additional secondary windings of said transformer connected in series with each other and in parallel relation with said burden, said adjusting means being mounted separately from said transformer.

RALPH HIGGINS.